United States Patent Office 2,778,805
Patented Jan. 22, 1957

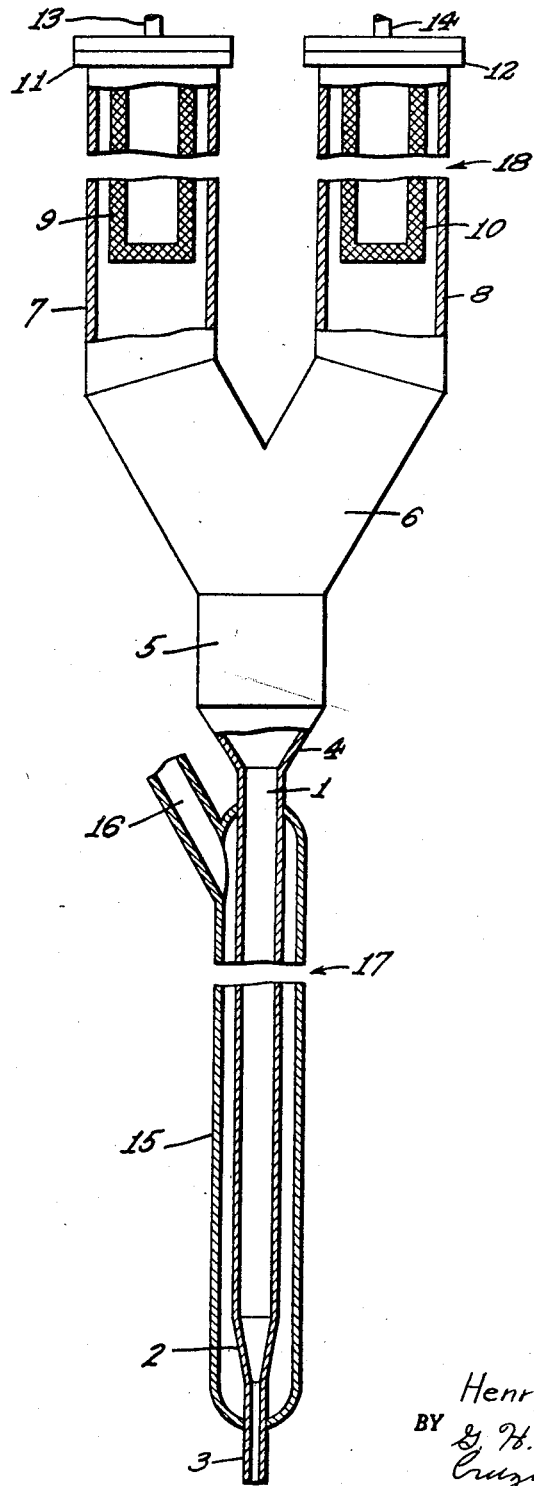

2,778,805

IRON SYNTHESIS CATALYST

Henry G. McGrath, Union, N. J., assignor to The M. W. Kellogg Company, Jersey City, N. J., a corporation of Delaware Original application February 1, 1947, Serial No. 725,835, now Patent No. 2,598,647, dated May 27, 1952. Divided and this application April 14, 1952, Serial No. 282,150

4 Claims. (Cl. 252—474)

This invention relates to the synthesis of organic compounds. In one aspect this invention relates to the hydrogenation of an oxide of carbon in the presence of a hydrogenation catalyst to produce hydrocarbons and oxygenated organic compounds. More particularly in this aspect the invention relates to the hydrogenation of carbon monoxide in the presence of an iron catalyst of a specific composition under conditions to produce a relatively high yield of oxygenated compounds. In another aspect this invention relates to the hydrogenation of carbon monoxide in the presence of an iron catalyst of a particular composition under conditions to produce a relatively high yield of hydrocarbons useful as motor fuel. This application is a division of application Serial No. 725,835, filed February 1, 1947, now issued as Patent No. 2,598,647.

It has been known for some time that hydrogen and carbon monoxide may be made to react exothermically in the presence of catalysts under specific reaction conditions to form hydrocarbons and oxygenated compounds having more than one carbon atom per molecule. In general, the synthesis of these organic compounds by the hydrogenation of carbon monoxide is accomplished in the presence of a metal or an oxide of a metal chosen from group VIII of the periodic table as a catalyst, at pressures below about 500 pounds per square inch gage and at temperatures below about 750° F. for the production of hydrocarbons and at pressures between about 1,000 and about 10,000 pounds per square inch gage and at temperatures above 750° F. for the production of oxygenated compounds.

The synthesis feed gas or reaction mixture comprises a mixture of about one to two mols of hydrogen per mol of carbon monoxide and may be prepared by the catalytic conversion of natural gas, steam, and carbon dioxide.

Various methods have been practiced to effect the reaction of hydrogen and carbon monoxide to produce organic compounds. Among these methods are those known as fixed-bed catalyst operations and fluid-bed catalyst operations. The fixed-bed operation comprises passing a reaction mixture of hydrogen and carbon monoxide through a stationary bed of catalyst in a reaction zone, and the fluid-bed operation comprises passing a reaction mixture through a finely divided catalyst mass suspended in the reaction mixture in the reaction zone.

It is an object of this invention to provide a process for the synthesis of organic compounds having more than one carbon atom per molecule.

It is another object of this invention to provide a process for the production of oxygenated compounds in a relatively high yield by the reaction of carbon monoxide and hydrogen in the presence of a hydrogenation catalyst.

Another object of this invention is to provide a process for the production of hydrocarbons useful as a motor fuel in relatively high yield by the reaction of carbon monoxide and hydrogen in the presence of a hydrogenation catalyst.

Still another object of this invention is to provide a novel catalyst for the hydrogenation of carbon monoxide.

A further object of this invention is to provide a method for producing a hydrogenation catalyst useful for the hydrogenation of carbon monoxide.

It is still a further object of this invention to provide a particular novel catalyst adapted to the fluidized process for the hydrogenation of carbon monoxide to produce a particular organic compound.

Yet another object is to provide a process for the synthesis of organic acids.

Various other objects and advantages will become apparent to those skilled in the art from the accompanying description and disclosure.

According to a preferred embodiment of this invention, I have found that a metal or metal oxide hydrogenation catalyst containing between about 0.1 percent and about 2.5 percent by weight of an oxide of potassium is very effective for the hydrogenation of an oxide of carbon to produce a high yield of organic compounds having more than one carbon atom per molecule. For maximum yields and selectivity, a metallic iron or iron oxide catalyst containing between about 0.2 and about 2.0 percent by weight potassium oxide, $K_2O$, is preferred. A potassium oxide content above about 2.5 weight percent results in excessive formation of wax on the catalyst, which decreases the activity and life of the catalyst; while a potassium oxide content below about 0.1 weight percent results in substantially increased yields of carbon dioxide, methane, ethane, and other low molecular weight hydrocarbons.

It has further been found according to this invention that the amount of potassium oxide in the catalyst is critical with respect to the type of product produced. Thus, for the production of oxygenated compounds, especially the relatively high molecular weight alcohols and organic acids, the catalyst must contain at least about 0.8 weight percent, and preferably between about 1.0 and about 1.5 weight percent potassium oxide. When it is desired to produce relatively high molecular weight hydrocarbons accompanied by a minimum amount of oxygenated compounds, it has been found that the catalyst must contain between about 0.2 percent and about 0.7 percent potassium oxide. The percent $K_2O$ is based on the elementary metal content of the catalyst.

A high alkali iron catalyst containing between about 0.8 percent and about 1.5 percent $K_2O$ produces a much larger amount of oxygenated compounds than a metallic iron catalyst of lower potassium oxide content under comparable reaction conditions. In fact, in some instances, as much as four or five times as much oxygenated compounds are produced by such a high alkali catalyst as with a lower alkali catalyst. Of the oxygenated compounds produced with the high alkali catalyst, the normal alcohols, such as ethanol, propanol, butanol, and pentanol, along with such organic acids as acetic, propionic, and butyric acids comprise the major portion of the organic compounds. In contrast, with a low alkali catalyst substantially negligible amounts of organic acids are produced and generally relatively smaller amounts of oxygenated compounds are produced. It has also been noted that with the high alkali catalyst of the present invention, a substantial proportion of the relatively low molecular weight hydrocarbons produced are olefinic and are present in the product in a relatively larger proportion than in the product of the low alkali catalyst. It is possible to operate with the high alkali catalyst at relatively higher temperatures than is possible with low alkali catalysts without excessive formation of coke on the catalyst.

On the other hand, it has been found that a low alkali iron catalyst containing between about 0.2 percent and about 0.7 percent potassium oxide produces the maximum yield of hydrocarbons. In the hydrogenation of carbon monoxide with a low alkali catalyst according to this invention the maximum yield of hydrocarbons of high quality boiling within the gasoline range are obtained. Furthermore, the low alkali iron catalyst produces a hydrocarbon fraction useful as a diesel fuel of much higher quality than that produced with a high alkali catalyst. Relatively higher space velocities for somewhat lower temperatures may be used with the low alkali catalyst than with the high alkali catalyst for an equivalent conversion of carbon monoxide.

Although potassium oxide has been found to be the much preferred activating compound when incorporated with a hydrogenation catalyst comprising a metal and/or metal oxide, other potassium compounds and other inorganic compounds of alkali metals and alkaline earths, such as sodium, barium, and lithium, are capable of being incorporated with the hydrogenation catalyst in above ranges previously qualified with respect to $K_2O$ when calculated as the oxide and based on total metal. Preferably, such activating compounds of alkali metals and alkaline earths contain oxygen in the form of the hydroxide, carbonate, sulphate, silicate, phosphate, aluminate, chromate, nitrate, and borate. Potassium carbonate, nitrate, hydroxide, and chloride have shown very good results, particularly when these compounds were incorporated with a hydrogenation catalyst comprising iron in quantities greater than about 0.8 weight percent (calculated as $K_2O$) high yields of oxygenated organic compounds were produced. Mixtures of these compounds may be used as the activating material without departing from the scope of this invention, and when mixtures are used the alkali content calculated as the oxide is considered as either the total quantity of compounds or the quantity of any single compound.

The activating compound, such as $K_2O$, may be incorporated with the hydrogenation catalyst in a solid solution or a fused condition therewith, or it may be merely on the surface of the hydrogenation catalyst uncombined therewith in any way. For example, a naturally occurring magnetite may be mixed with an appropriate amount of potassium hydroxide or potassium carbonate and the resulting mixture fused. The fused mixture is then pulverized and reduced with hydrogen at a temperature between about 900° F. and about 1600° F. In this manner of preparation the potassium oxide is present in the ultimate catalyst in a fused condition with iron. In another manner of preparation in which the alkali is on the surface of the catalyst uncombined with the iron, naturally occurring magnetite is fused, pulverized, mixed with potassium carbonate, and the resulting mixture reduced.

The catalyst of this invention may be employed in stationary or fixed-bed condition, as well as the fluidized or fluid-bed condition; however, it is much preferred to employ it in a fluidized condition.

A preferred embodiment of this invention involves flowing a gaseous mixture comprising hydrogen and a carbon oxide to be hydrogenated upwardly in a reaction zone in contact with a mass of finely divided metallic iron catalyst containing an appropriate amount of potassium oxide for producing the desired product. The hydrogen and carbon oxide reactants are passed as gases through the reaction zone, under conditions effective to react all, or a portion, of the carbon oxide reactant. The gaseous mixture is passed upwardly through the mass of catalyst at a velocity sufficient to suspend or entrain the catalyst mass in the gas stream. Preferably, the velocity of the gas stream passing through the reaction zone is sufficiently low to maintain the catalyst mass in a dense, fluidized pseudo-liquid condition. However, the velocity may be sufficiently high to entrain at least a substantial portion of the finely divided catalyst in the gas stream to form a continuous catalyst phase which circulates with the flowing gas stream, without departing from the scope of this invention. In the former condition the catalyst mass may be said to be suspended in the gas stream, but not entrained therein in the sense that there is movement of the catalyst mass as such in the direction of flow of the gas stream. When operating with the catalyst in the pseudo-liquid condition it is preferred to maintain the upward velocity of the gas stream sufficiently high to maintain the fluidized catalyst mass in a highly turbulent condition in which the catalyst particles circulate at a high rate in the pseudo-liquid mass. In this pseudo-liquid condition of operation a small proportion of catalyst in the fluidized mass may become entrained in the gas stream emerging from the upper surface of the fluidized mass whereby catalyst thus entrained is carried away from the mass.

In the present process it is preferred to employ the hydrogen and carbon oxide in ratios such that there is an excess of hydrogen. Therefore, the charging rate in the present process is defined by reference to the rate at which the carbon oxide is charged, in terms of standard cubic feet, in the gas form, of the carbon oxide, per hour per pound of the metal catalyst in the dense pseudo-liquid mass of catalyst in the reaction zone. The fluidized process is preferably operated at a minimum space velocity equivalent to charging rate of about 1.0 standard cubic foot of the carbon oxide reactant, per hour, per pound of the metal catalyst in the dense catalyst phase. A standard cubic foot of the carbon oxide is that quantity of a normally gaseous carbon oxide which would occupy one cubic foot at atmospheric pressure at 60° F., or an equivalent quantity of a normally liquid carbon oxide reactant. Generally, with fluidized dense phase operation and pressures between 150 and 300 pounds per square inch gage with the high alkali catalyst, a space velocity between about 4 and about 10 standard cubic feet of the carbon oxide reactant, per hour per pound of the iron catalyst is used. With the low alkali catalyst a space velocity between about 10 and about 25 is used.

The catalyst employed in the present invention is a finely divided powder comprising a metal and/or metal oxide containing the appropriate amount of potassium oxide which is, or becomes in the reaction zone a catalyst for the reaction, or a mixture of such metal or metal oxide and other catalytic materials or non-catalytic materials. While the catalyst powder consists essentially of such catalytic metal or metal oxide containing potassium oxide it may include also a minor amount of promoting ingredients, such as alumina, silica, titania, thoria, manganese oxide, magnesia, etc.

In this specification and claims the catalyst employed is described by reference to its chemical condition when first contacted with the reactants.

The catalyst is employed in a fine state of sub-division. Preferably, the powdered catalyst initially contains no more than a minor proportion by weight of material whose particle size is greater than 250 microns. Preferably also, the greater proportion of the catalyst mass comprises material whose particle size is smaller than 100 microns, including at least 25 weight percent of the material in particle sizes smaller than 40 microns. A highly desirable powdered catalyst comprises at least 75 percent by weight of material smaller than 150 microns in particle size, and at least 25 percent by weight smaller than about 40 microns in particle size.

In the preferred form of the invention with the catalyst present in a pseudo-liquid condition, the powdered catalyst mass is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the catalyst concentration is much lower, and of a different order of magnitude, than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carrying capacity of the gas stream at the superficial velocity of the gas stream. The latter is the velocity at which the gas stream would flow through the reactor in the absence of catalyst. In the dense phase the concentration of the catalyst in the gas stream varies from a maximum near the gas inlet to a minimum in the upper part of this phase. Likewise the concentration of catalyst in the diffuse phase varies from a maximum near the upper surface of the dense phase to a minimum in the upper part of the reactor. Between the dense phase of high average concentration and the diffuse phase of low average concentration there is a relatively narrow zone in which the concentration of solids in the gas stream changes in a short space from the high concentration of the dense phase to the low concentration of the diffuse phase. This zone has the appearance of an interface between two visually distinct phases.

This operation ordinarily involves employment of catalyst powders and gas velocities such that a relatively small portion of the dense fluidized catalyst mass is carried away by entrainment, and it is necessary, therefore, to provide means in the reactor for separating such entrained catalyst and returning it to the dense phase, or to provide means externally of the gas reactor to separate entrained catalyst from the gas stream and return it to the reactor, or otherwise to recover catalyst from the product gas stream.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The pseudo-liquid operation in which the finely powdered catalyst is employed in a form consisting of the metallic iron catalyst and containing at most minor proportions of promoting agents, other than potassium oxide, provides very high catalyst concentrations in the reaction zone. The employment of the finely powdered metal catalyst in a fluidized bed with efficient cooling means also is a factor in permitting the use of high catalyst concentrations, since it facilitates the removal of heat from the relatively concentrated reaction zone. The pseudo-liquid operation, employing the finely divided metal catalyst, results in initial catalyst concentrations of at least 30 pounds per cubic foot of the fluidized dense catalyst phase, while the preferred gas velocities result in initial concentrations of 40 to 120, or more, pounds per cubic foot of dense phase. It will be understood that these figures refer to the initial average concentration in the dense phase. The accumulation of reaction products on the catalyst particles as the operation proceeds reduces the catalyst density and increases the bulk of the dense fluidized mass.

With an iron catalyst containing an oxide of potassium, temperatures in the range of about 350° F. to about 750° F. are employed. Usually about 30° F. to about 50° F. higher temperatures are necessary with the high alkali catalyst than with the low alkali catalyst. With the iron catalyst, pressures between atmospheric pressure and the maximum pressure at which condensation is avoided may be employed. It is desirable, however, to employ pressures of at least 50 p. s. i. and preferably about 150 to about 500 p. s. i.

In this specification, pressures are expressed as pounds per square inch gage and gas volumes as cubic feet measured at 60° F. and atmospheric pressure.

The linear velocity of the gas stream passing upwardly through the dense phase is conveniently expressed in terms of the superficial velocity, which is the linear velocity the charge gas stream would assume if passed through the reactor in the absence of catalyst. This superficial velocity takes into account the shrinkage in volume caused by the reaction and is, preferably, in the range of from 0.1 to 10 feet per second. When operating with a continuous catalyst phase in which the catalyst is entrained in the flowing gaseous mixture, velocities as high as 40 feet per second may be used.

The reactants are passed into and through the reaction zone at a space velocity equivalent to at least 1.0 standard cubic feet of carbon oxide per hour per pound of metal catalyst in the dense catalyst phase. In the hydrogenation of carbon monoxide with the iron catalyst it is preferred to operate at a space velocity equivalent to at least 2.0 standard cubic feet of carbon monoxide per hour per pound of iron catalyst in the dense catalyst phase. The charging rate is defined by reference to the carbon monoxide reactant, since the ratio of the hydrogen reactant to the carbon monoxide reactant in the charge gas may vary within wide limits. This ratio of hydrogen to carbon monoxide is usually in excess of about 0.7:1 and preferably at least 1:1 and often as high as 10:1. At the 1:1 ratio the preferred charging rate of hydrogen and carbon monoxide would, therefore, be at least 4.0 standard cubic feet per hour per pound of iron catalyst in the dense catalyst phase. At a 2:1 ratio this preferred rate would be 6.0 standard cubic feet of hydrogen and carbon monoxide.

The volume of reactants per hour per volume of dense pseudo-liquid catalyst phase depends upon the charge rate and also upon the concentration of catalyst in the dense phase, the latter being affected by the condition of the catalyst and the gas velocity. At the preferred gas velocities mentioned above for the pseudo-liquid operation, and when employing an iron catalyst, the minimum space velocity may be defined as 2 cubic feet of carbon monoxide per hour per pound of iron catalyst.

According to a preferred modification of this invention a fresh feed gas having an $H_2$:$CO$ ratio higher than the ratio in which these compounds are converted to other compounds is employed and the ratio of hydrogen to carbon monoxide in the charge to the reactor is increased to the desired figure by recycling a portion of the unconverted gas, after removal of part or all of the product liquid. A gas containing excess hydrogen is processed under conditions effective to react all, or a portion, of the carbon monoxide, and a portion of the product mixture, after removal of the greater part of the liquid product, is recycled in volumetric ratios, to the fresh feed gas, of 0.5:1 to 10:1. Since in one embodiment of this invention, a relatively large amount of oxygenated compounds are produced, a portion of the oxygenated organic compounds comprising the relatively low boiling compounds, such as the ketones and aldehydes, are separated and recycled to the hydrogenation reaction to increase the yield of oxygenated organic compounds of relatively high boiling point. A similar effect on the production of oxygenated organic compounds is also accomplished by recycling unsaturated compounds, such as olefins, which have been separated from the effluent of the hydrogenation reaction. Unsaturated and oxygenated compounds from sources other than the process itself may be introduced into the reaction without departing from the scope of this invention.

Fluid operations are carried out at temperature levels which are relatively high as compared to those which would be permissible in fixed catalyst bed operations under comparable operating conditions. This results from the excellent heat transfer capacity of the fluidized mass of finely divided iron or iron oxide and the effect of excess hydrogen in minimizing carbon formation. It is preferred to operate at whatever temperature level, in the range of 350° F. to 750° F., is necessary to effect high conversion of carbon monoxide when treating a gas charge containing more hydrogen than carbon monoxide, at space velocities equivalent to at least 2 standard cubic feet of carbon monoxide per hour per pound of iron catalyst in the dense phase.

The invention will be described further by reference to the accompanying drawing which is a view in elevation, partly in section, of a reactor employed in carrying out the present invention by a pseudo-liquid operation, and by reference to specific examples of operations embodying the present invention and carried out in apparatus exemplified by the drawing.

Referring to the drawing, reactor 1 consists of a length of extra heavy 2-inch steel pipe which is about 240 inches long and has inside and outside diameters of 1.95 inches and 2.50 inches, respectively. Reactor 1 is connected by a conical section 2 to an inlet pipe 3 made of extra heavy half-inch steel pipe having an inside diameter of 0.55 inch. Reactor 1 is connected at the top, by means of a conical section 4, with an enlarged conduit 5 comprising a length of 8-inch extra heavy steel pipe having an inside diameter of 7.63 inches. Conical section 4 and conduit 5 constitute an enlarged extension of reactor 2 which facilitates disengagement of catalyst from the gas stream after passage of the latter through the dense catalyst phase.

Conduit 5 is connected by means of a manifold 6 with conduits 7 and 8 which comprise other sections of extra heavy 8-inch steel pipe. Conduits 7 and 8 contain filters 9 and 10 which are constructed of porous material which is permeable to the gas and vapors emerging from the reaction zone but impermeable to the catalyst particles carried by entrainment in the gas stream. Filters 9 and 10 are cylindrical in shape and closed at the bottom ends. They are dimensioned in relation to conduits 7 and 8 to provide a substantial annular space between the filter and the inner wall of the enclosing conduit for the passage of gases and vapors and entrained catalyst upwardly about the outer surface of the filter. The upper ends of filters 9 and 10 are mounted in closure means 11 and 12 in a manner whereby the gases and vapors must pass through either filter 9 or filter 10 to reach exit pipes 13 and 14. Each of filters 9 and 10 is approximately 36 inches long and 4½ inches in ouside diameter, the filter walls being approximately ¾ of an inch thick.

The greater part of reactor 1 is enclosed in a jacket 15 which extends from a point near the top of reactor 1 to a point sufficiently low to enclose the 3-inch length of conical section 2 and approximately 5 inches of pipe 3. Jacket 15 comprises a length of extra heavy 4-inch steel pipe having an inside diameter of 3.83 inches. The ends of jacket 15 are formed by closing the ends of the 4-inch pipe in any suitable manner, as shown. Access to the interior of jacket 15 is provided by an opening 16 in the top thereof through a 2-inch steel pipe. Jacket 15 is adapted to contain a body of liquid for temperature control purposes, such as water or Dowtherm. The vapors which are evolved by the heat of reaction are withdrawn at 16, condensed, and returned to the body of temperature control fluid in jacket 15. The condensate returned to jacket 15 may be introduced through line 16, or directly at a low point, adjacent pipe 3, by an inlet means not shown. The temperature control fluid in jacket 15 is maintained under a pressure at which the liquid boils at the temperature desired in jacket 15. Heating coils, not shown, are provided in connection with jacket 15 to maintain the temperature control fluid therein at any desired temperature when it is desired to heat the contents of reactor 1.

In order to show all the essential parts of the reactor and associated catalyst separation means on a single sheet, a large proportion of the apparatus has been eliminated by the breaks at 17 and 18. For a clear understanding of the relative proportions of the apparatus, reference may be had to the over-all length of the apparatus, from the bottom of jacket 15 to exit pipes 13 and 14, which is about 310 inches. In each of breaks 17 and 18 the portion of the apparatus eliminated is identical with that portion shown immediately above and below each break.

In pseudo-liquid operations carried out in this apparatus the catalyst recovery means, comprising filters 9 and 10, are effective to separate substantially completely entrained catalyst from the outgoing stream of gases and vapors. The disengagement of solids from the gas stream is promoted by the lowered velocity of the gas stream in conduit 5 and remaining solids are separated on the outer surfaces of filters 9 and 10. The latter are employed alternatively during the operation so that the stream of gases and vapors and entrained solids passes from conduit 5 through either the left or right branches of manifold 6 into conduit 7 or conduit 8. During the alternate periods the filter which is not in use is subjected to a back pressure of gas which is introduced at a rate sufficient to dislodge catalyst which has accumulated on the outer surface of the filter during the active period. Such blowback gas and dislodged catalyst flow downwardly in the conduit enclosing the filter and into manifold 6, in which the blow-back gas is combined with the reaction mixture flowing upwardly from conduit 5. The greater part of the catalyst thus dislodged settles downwardly into the reactor and is thus returned for further use.

The amount of catalyst charged to the reactor initially is regulated, with reference to any preliminary treatment of the catalyst in the reactor and the gas velocity to be employed, whereby the upper level of the dense phase is substantially lower than the top of reactor 1. During the operation the accumulation of deposited reaction products on the catalyst particles may cause an expansion of the dense phase and a rise in the height of the dense phase.

In the operation of the apparatus of the drawing the desired quantity of powdered catalyst is introduced directly into the reactor through a suitable connection, not shown, in conduit 5. After any desired preliminary activation treatment the temperature of the fluid in jacket 15 is adjusted, by the heating means mentioned above and by the pressure control means, to the temperature desired in jacket 15 during the reaction. After the catalyst mass has reached the reaction temperature the introduction of the reaction mixture through pipe 3 is initiated. During the reaction the liquid in jacket 15 is maintained at the desired temperature by controlling its pressure. The reaction mixture may be preheated approximately to the reaction temperature prior to its introduction through pipe 3, or the reactants may be heated to the reaction temperature through the passage thereof through that portion of pipe 3 which is enclosed by jacket 15 and by contact with the hot catalyst. In most of the operations described hereinafter it was preferred to preheat the reaction mixture to temperatures of at least 350° F.

Pipe 3 is dimensioned with respect to reactor 1 and the desired superficial velocity whereby the velocity of the gases passing through pipe 3 is sufficiently high to prevent the passage of solids downwardly into pipe 3 against the incoming gas stream. An orifice plate, now shown, is provided in pipe 3 to prevent solids from passing downwardly out of the reactor when the gas stream is not being introduced into pipe 3.

In this apparatus operating runs were made to test the efficacy of the catalyst of this invention in the treatment of a gas charge containing hydrogen and carbon monoxide to convert these reactants to hydrocarbons and oxygenated compounds. In each operating run the alkali content of the catalyst was varied to test the effect of various combinations of catalyst compositions. The results of each operating run are represented by the results observed during a stabilized period of operation under a given combination of operating conditions. The conditions of operation and the results obtained in these operating runs are described below in the following example and tables.

EXAMPLE

The catalysts for use in these operations were prepared from an ammonia synthesis catalyst which had been prepared by fusion of alumina and potassium oxide in molten iron oxide to produce a mixture of iron oxide, alumina, and potassium oxide. This material consisted principally of iron oxide and contained about 2.9 percent alumina, about 3.4 percent potassium oxide, and lesser amounts of titania and silica. To prepare this material for use in this improved process it was first ground to a 6 to 20 mesh size and then subjected to leaching with water to remove the desired amount of potassium oxide. This treatment reduced the potassium oxide content from about 3.4 percent to about 0.3, about 0.6, and about 1.4 percent for three separate catalysts based on Fe. The leached material was then dried at 210° F. and reduced in a stream of hydrogen.

In the reduction treatment a heated stream of hydrogen was passed through the granular mass of iron oxide, treated to remove water formed by the reduction reaction, and then recirculated. The temperature was raised gradually and the reduction reaction was initiated at about 600° F. to 800° F. The temperature of the catalyst mass was then raised to about 1215° F. in two hours while continuing the flow of the hydrogen stream. During the next 4 hours the temperature was raised to approximately 1285° F., during which time the reduction was substantially completed, as evidenced by the practical cessation of water formation. The reduction is usually carried out at a temperature between about 1200° F. and about 1400° F.

Each of the reduced catalysts were ground in an atmosphere of carbon dioxide, first in a hand grinder and then in a ball mill, to produce a powder smaller than 250 microns and having approximately the following screen and roller analysis:

*Table 1*

ROLLER ANALYSIS

| Particle size, microns: | Percent |
|---|---|
| 0–10 | 11.0 |
| 10–20 | 16.4 |
| 20–40 | 20.6 |
| 40–60 | 32.2 |
| 60+ | 19.8 |

SCREEN ANALYSIS

| U. S. standard sieve: | Percent |
|---|---|
| +40 mesh | Trace |
| 40–60 | Trace |
| 60–80 | 0.5 |
| 80–100 | 0.5 |
| 100–120 | Trace |
| 120–140 | Trace |
| 140–200 | 13.5 |
| 200–Pan | 84.5 |

Between about 15,000 and 20,000 grams of catalyst thus prepared were charged into reactor 1 through an inlet (not shown) in section 5. During this operation the catalyst was maintained in the atmosphere of carbon dioxide and a small stream of 1 or 2 cubic feet of carbon dioxide per hour was passed upwardly through reactor 1 to prevent packing of the catalyst. After the catalyst was charged to reactor 1, the carbon dioxide stream was replaced with a stream of hydrogen which was passed upwardly through reactor 1 at the rate of 15 to 20 cubic feet per hour. The reactor was then heated externally while hydrogen was passed upwardly through the reactor at this rate. When the desired temperature was reached the hydrogen stream was replaced by a stream of synthesis gas consisting essentially of hydrogen and carbon monoxide in the desired ratio. The synthesis gas was passed upwardly through reactor 1 at the rates shown in the following tables. At the same time the outlet pressure on the reactor was gradually increased to 150 pounds and 250 pounds, respectively.

An effluent was removed from reactor 1 and unreacted reactants and products of the process were separated therefrom. The reaction products were recovered for the most part by cooling the reaction mixture to room temperature or lower to obtain a condensate and by passing the uncondensed gases through an absorber, such as activated charcoal. The condensate comprised both heavy oil and water product fractions. The heavy oil fraction contained a minor proportion of oxygenated compounds and the water product fraction contained substantial amounts of oxygenated compounds. The absorbed products were recovered by steam distillation which yielded a light naphtha fraction, condensed water, and a gaseous fraction. The water contained additional oxygenated compounds. The gaseous fraction was almost entirely hydrocarbons having three to five carbon atoms per molecule. The yield of the various fractions were determined by measurement of the condensed product and by absorption and combustion analysis of the gas from the condenser. Oxygenated compounds were recovered in most instances from the products by distillation of the water product, by extraction of the condensed oil with ethylene glycol and by water scrubbing the gaseous fraction. The recovery of oxygenated organic products from the synthesis effluent is discussed in considerably more detail in copending applications, Serial Nos. 709,871, now Patent No. 2,470,782, and 709,872, filed November 14, 1946, now Patent No. 2,571,151, of which I am a co-inventor. It is believed, therefore, that it is unnecessary to discuss the recovery of the oxygenated products in detail in this application since reference may be made to the aforesaid copending applications if necessary.

The following table shows the operating conditions and resulting yields and selectivity for various typical runs for an iron catalyst having 0.3, 0.6, and 1.4 percent $K_2O$ content, respectively. The five runs illustrated were selected as representative of the various runs made in determining the characteristics of the catalyst.

*Table II*

COMPARISON OF HIGH AND LOW ALKALI CATALYSTS YIELDS AND SELECTIVITY

| Alkali Content, Percent $K_2O$ | 1.4 | 0.6 | 0.6 | 0.3 | 0.3 |
|---|---|---|---|---|---|
| Operating Conditions: | | | | | |
| Pressure, p. s. i. | 250 | 250 | 250 | 250 | 250 |
| Temperature, °F | 630 | 570 | 595 | 555 | 565 |
| Space Velocity— | | | | | |
| V./Hr./V. | 470 | 700 | 1,150 | | |
| C. F./Hr./Lb. Fe[1] | 15 | 21 | 51 | 39.0 | 59.0 |
| Recycle Ratio, Rec./F. F. | 1.5 | 1.5 | 1.5 | 1.9 | 1.9 |
| $H_2$:CO in Fresh Feed | 1.4 | 1.4 | 1.4 | 1.4 | 1.8 |
| $H_2$:CO in Inlet | 2.3 | 2.4 | 2.2 | 1.8 | 2.4 |
| CO Conversion, Percent | 90 | 90 | 90 | 85 | 86 |
| Yields, Basis Fresh Feed,[2] cc./m.³: | | | | | |
| $C_3$ | 40 | 33 | 41.5 | 67 | 59 |
| $C_4$ | 25 | 20 | 24.5 | | |
| $C_5$—400° F., E. P. | 70 | 96 | 84 | 57 | 51 |
| 400-650° F | 12 | 15 | 11 | | |
| 650° F.+ | 2 | 5.5 | 4 | 1 | 1 |
| Total Hydrocarbons | 149 | 169.5 | 165 | 125 | 111 |
| Oxygenated Compounds | 47 | 12 | 12 | 8 | 8 |
| Total liquid organic compounds | 196 | 181.5 | 177 | 133 | 119 |
| Water | 102 | 108 | 108 | 70 | 90 |
| Selectivity, Percent: | | | | | |
| CO→$CO_2$ | 30.0 | 30.5 | 30.5 | 32.3 | 27 |
| CO→$CH_4$ | 5.8 | 8.4 | 10.1 | 21.0 | 28 |
| CO→$C_2$ | 9.2 | 7.4 | 8.8 | | |
| CO→$C_3$ | 9.5 | 8.0 | 9.9 | 21.2 | 20.5 |
| CO→$C_4$ | 6.7 | 5.4 | 6.6 | | |
| CO→$C_5$ | 6.6 | 8.9 | 9.1 | | |
| CO→$C_6$ | 3.9 | 5.1 | 4.8 | | |
| CO→$C_7$ | 2.9 | 4.5 | 4.1 | 22.5 | 22.5 |
| CO→$C_8$ | 1.8 | 3.5 | 2.6 | | |
| CO→$C_9$ | 1.6 | 3.6 | 2.7 | | |
| CO→$C_{10}$+ | 8.4 | 11.7 | 7.8 | | |
| CO→Oxygenated Compounds | 13.6 | 3.0 | 3.0 | 2.0 | 2.0 |
| CO→Liquid Organic Compounds | 55.0 | 53.7 | 50.6 | | |

[1] Based on total fresh feed (CO+$H_2$).
[2] Inert free.

The results obtained with the various catalysts containing different potassium oxide contents indicated that the catalysts containing the smaller amounts of alkali were most active in the conversion of carbon monoxide. The relative activity is seen in the foregoing table in the fact that the high alkali catalyst required a higher temperature and a lower space velocity to obtain approximately the same amount of CO conversion as the lower alkali catalyst.

A comparison of the yields and of the selectivity of the three catalysts is also found in the foregoing table. No allowance has been made for possible losses in the various recovery systems. Examination of Table II indicates that the catalyst containing a higher amount of alkali produced more than four times as much oxygenated compounds as did the lower alkali catalyst. Generally, the high alkali catalyst had a slightly lower hydrocarbon yield than the lower alkali catalyst. At comparative space velocities, the high alkali (1.4 percent $K_2O$) catalyst produced slightly more low boiling hydrocarbons than did the 0.6 percent $K_2O$ catalyst, but the low boiling hydrocarbons were formed at the expense of a decrease in yield of 400° F. end point gasoline.

The oxygenated compounds with the low alkali catalyst were predominantly alcohols and are produced concurrently with the hydrocarbons and are considered very valuable products. With the high alkali catalyst, the acid product was almost equal to the alcohol product. The catalyst containing the 1.4 percent $K_2O$ produced a much larger amount of oxygenated organic compounds than did the other catalyst. For example, the operation shown with the 1.4 $K_2O$ catalyst resulted in 47 cc./m.³ of oxygenated compounds as compared with the 0.6 percent $K_2O$ catalyst and the 0.3 percent $K_2O$ catalyst which produced 12 and 8 cc./m.³, respectively. The high alkali catalyst also produced somewhat larger proportions of total liquid products than did the lower alkali catalyst, as is noted in the Table II. The relative CO distribution for the various catalysts shown in Table II under "Selectivity" clearly indicates the greater selectivity exhibited by the 1.4 percent $K_2O$ catalyst where approximately 55 percent of the CO was converted to liquid hydrocarbons and chemicals, as compared with 44.5–53.7 percent for the other catalysts. As previously mentioned the yields of oxygenated compounds were much greater with the high alkali catalyst than with the low alkali catalyst.

Table III shows a comparison of the distribution of the oxygenated compounds for the 1.4 percent $K_2O$ catalyst and the 0.6 percent $K_2O$ for operating conditions given in Table II. The normal straight chain primary alcohols are substantially the only type of alcohols produced with either catalyst. The most striking difference between the oxygenated compounds from the two catalysts was in the acid content which was almost negligible with the 0.6 percent $K_2O$ catalyst and was as high as about 34 percent of the total oxygenated chemicals with the 1.4 percent $K_2O$ catalyst. It is also noted that there was a shift toward a substantially larger production of high alcohols with the 1.4 percent $K_2O$ catalyst.

*Table III*

COMPARISON OF HIGH AND LOW ALKALI CATALYSTS OXYGENATED COMPOUND DISTRIBUTION

| Alkali Content, $K_2O$ percent by weight | 1.4 | 0.6 |
|---|---|---|
| Distribution of Oxygenated Compounds, Vol. Percent: | | |
| Acetaldehyde and Propionaldehyde | 2.2 | negligible. |
| Acetone | 0.9 | 8.6. |
| Methyl Ethyl Ketone | 0.5 | 5.7. |
| Miscellaneous Aldehydes and Ketones in Oil | 9.1 | negligible. |
| Methyl Alcohol | 1.2 | |
| Ethyl Alcohol | 25.8 | 46.9. |
| Propyl Alcohol | 5.2 | 26.8. |
| Butyl Alcohol | 4.0 | 8.3. |
| Amyl Alcohol | 1.7 | 1.4. |
| Hexyl Alcohol | 2.0 | 1.4. |
| Heptyl + Higher Alcohols | 5.1 | 0.9. |
| Acetic Acid | 9.8 | |
| Propionic Acid | 4.6 | |
| Butyric + Higher Acids | 19.1 | |
| Total Acid | 33.5 | negligible. |
| Esters | 8.8 | negligible. |

The comparative olefin contents of the hydrocarbon fractions obtained with the recovery operations conducted in these runs when employing the 1.4 percent $K_2O$ catalyst and the 0.6 percent $K_2O$ catalyst are found in Table IV. The hydrocarbons from the high alkali catalyst included more olefins than those from the low alkali catalyst. The difference is particularly noticeable in the low boiling hydrocarbons, i. e., from $C_2$ to $C_4$ hydrocarbons. The light gasoline recovered from the charcoal absorber had approximately the same olefinic content for each catalyst but the heavy oil and wax for the operation with the high alkali catalyst showed much less unsaturation than did the heavy oil and wax for the low alkali catalyst. This large difference in the olefinic condition of the heavy oil and wax was probably caused by the presence of non-hydrocarbons, such as alcohols and acids, and therefore the actual values based on the hydrocarbon alone would probably show much closer agreement; for example, the heavy oil and wax from the high alkali catalyst contained 30 to 35 percent oxygenated compounds and on the other hand the same material from the low alkali catalyst contained about 5 or 6 percent oxygenated compounds.

Table IV

COMPARISON OF HIGH AND LOW ALKALI CATALYSTS OLEFIN CONTENT OF HYDROCARBON FRACTIONS

| Alkali Content, $K_2O$ percent by weight | 1.4 | 0.6 | 0.6 | 0.3 |
|---|---|---|---|---|
| Space Velocity, C. F./Hr./Lb. Fe [1] | 15 | 21 | 51 | 39 |
| Olefins, Percent: | | | | |
| $C_2$ | 70 | 19 | 19 | |
| $C_3$ | 90 | 64 | 58 | 38 |
| $C_4$ | 90 | 71 | 68 | 60 |
| Adsorber Gasoline ($C_5$-$C_{10}$) | 75 | 72 | 70 | 60 |
| Heavy Oil+Wax ($C_{10}$+) | 52 | 70 | 69 | 58 |

[1] Based on total fresh feed ($CO+H_2$).

Since in commercial processes the $C_3$ and the $C_4$ olefins could be polymerized to form polymer gasoline, the distribution of the liquid hydrocarbons after the formation of 10 lb. R. V. P. gasoline with the incorporation of the polymer are summarized in Table V. The gasoline fraction for the 1.4 percent $K_2O$ catalyst was an appreciably larger portion of the total liquid hydrocarbons because of the large amount of polymers obtained from unsaturated $C_3$ to $C_4$ fraction. It should be noted that the high alkali catalyst produced insufficient $C_4$ hydrocarbons to make 10 lb. R. V. P. gasoline after polymerization while on the other hand the low alkali catalyst produced an excess amount of light hydrocarbons amply sufficient for the production of 10 lb. R. V. P. gasoline.

The 400° F. end point gasoline inspection are also summarized in Table V. For comparative space velocity with the 1.4, 0.6, and 0.3 percent $K_2O$ catalyst the yields of gasoline including polymers was lowest for the 0.3 catalyst and highest for the 0.6 catalyst. The 400° F. end point gasoline yield ($C_3$+) with the added polymer was about 20 cc./m.$^3$ less from the high alkali catalyst than from the lower alkali catalyst. The large increase in gasoline yield when the catalytic polymer is included was caused by both the large yield of olefinic hydrocarbons and the large yield of relatively low boiling hydrocarbons, such as $C_3$ and $C_4$ hydrocarbons. This was particularly the case with the gasoline produced from the high alkali catalyst where the catalytic polymer comprised about 34 percent of the total gasoline.

The gasoline from the lower alkali catalyst was of a higher quality than that from the high alkali catalyst. Comparative results are shown in Table V for the raw gasoline including polymers and the gasoline after treatment of the naphtha fraction with activated alumina at 850° F. to destroy by dehydration, decarboxylation, etc., any oxygenated compounds present.

The data clearly indicates the improvement in gasoline quality by the alumina treating at 850° F. It was noted that the high alkali catalyst produced a gasoline which was not as susceptible to improvement by the alumina treatment as was the gasoline produced with the low alkali catalyst.

Table V

COMPARISON OF HIGH AND LOW ALKALI CATALYSTS HYDROCARBON YIELDS AND PRODUCT QUALITY

| Alkali Content, $K_2O$ percent by weight | 1.4 | | 0.6 | | 0.6 | |
|---|---|---|---|---|---|---|
| Space Velocity, C. F./Hr. Lb. Fe (Fresh Feed) | 15 | | 21 | | 51 | |
| Gasoline Composition, Vol. Percent: | | | | | | |
| $C_4$ | 3.1 | | 3.5 | | 1.5 | |
| Light Naphtha (100% $C_5$) | 21.4 | | 35.0 | | 47.7 | |
| Heavy Naphtha | 41.6 | | 42.5 | | 26.9 | |
| Catalytic Polymer (2# RVP) | 33.9 | | 19.0 | | 23.9 | |
| Quality of Gasoline (+Poly.): | | | | | | |
| Reid Vapor Pressure, p. s. i. | [1] 9.2 | | 10.0 | | 10.0 | |

| | Raw | Treated [2] | Raw | Treated [2] | Raw | Treated [2] |
|---|---|---|---|---|---|---|
| Octane Number— | | | | | | |
| ASTM—Clear | 68.0 | 69.5 | 70.0 | 72.0 | 71.0 | 73.0 |
| ASTM +3 cc. TEL/Gal. | 77.0 | 80.0 | 78.5 | 81.0 | 79.0 | 81.0 |
| Quality of Diesel Oil (400-650° F.): | | | | | | |
| Max. Pour, ° F. | +20 | | | | +5 | +10 |
| Flash Point, PMCC, ° F. | 196 | | | | 160 | 185 |
| SSU Viscosity at 100° F., Sec. | 35.4 | | | | 34.9 | 35.0 |
| Diesel Index | 47 | | | | 69 | 72 |

[1] Insufficient $C_4$'s to make 10# Reid.
[2] $Al_2O_3$ at 850° F.

Table VI

COMPARISON OF HIGH AND LOW ALKALI CATALYSTS DIESEL OIL QUALITY

| Alkali Content, $K_2O$ percent by weight | 1.4 | 0.6 | 0.6 | 0.6 | 0.6 |
|---|---|---|---|---|---|
| Diesel Oil Inspections | Raw [1] | Raw | Hydrogenated | $Al_2O_3$ Treated | Treated and Hydrogenated |
| Gravity, ° API | 42.1 | 44.9 | 46.3 | 44.8 | 46.9 |
| ASTM Distillation, ° F.: | | | | | |
| IBP | 388 | 369 | 410 | 430 | 423 |
| 10% | 461 | 451 | 464 | 460 | 448 |
| 30% | 493 | 472 | 480 | 472 | 468 |
| 50% | 519 | 496 | 505 | 500 | 492 |
| 70% | 557 | 533 | 546 | 536 | 531 |
| 90% | 611 | 589 | 600 | 596 | 589 |
| E. P. | 650 | 640 | 644 | 650 | 627 |
| Bromine No., gm./100 gm. | 42.1 | 44.1 | 2.2 | 45.4 | 1.4 |
| Aniline Point, ° F. | 111 | 154 | 178 | 161 | 186 |
| Max. Pour, ° F. | +20 | +5 | +20 | +10 | +15 |
| Flash Point, PMCC, ° F. | 196 | 160 | 204 | 185 | 187 |
| SSU Viscosity at 100° F., Sec. | 35.4 | 34.9 | 35.9 | 35.0 | 34.9 |
| Diesel Index | 47 | 69 | 82 | 72 | 87 |

[1] Partially extracted with ethylene glycol.

A comparison has been made in Tables V and VI of the quality of 400° F. to 650° F. Diesel oil produced with the 1.5 and the 0.6 percent K₂O catalyst. The diesel fraction from the low alkali catalyst was inspected raw, after hydrogenation of the raw diesel oil, after alumina treatment at 850° F., and after alumina treatment followed by hydrogenation. The hydrogenation material was of particularly good quality. The untreated diesel oil from the high alkali catalyst which had been glycol extracted to remove oxygenated compounds had an inferior diesel index. This was probably caused by the lower aniline point, which in turn was caused by the presence of alcohols and acids not removed by the glycol extraction.

The $C_3$ and $C_4$ hydrocarbons from the low alkali catalyst are in excess of that needed to produce 10 lb. R. V. P. gasoline while on the other hand the high alkali catalyst produced insufficient low boiling hydrocarbons to produce 10 lb. R. V. P. gasoline after polymerization. The quality of both the gasoline and the diesel oil is indicated on Tables V and VI, and was much superior when produced with a low alkali catalyst.

The product water from the high alkali catalyst operation using a 1.4 percent $K_2O$ catalyst contains a large concentration of organic oxygenated chemicals, such as acids, alcohols, ketones, aldehydes, and esters. Additional water soluble chemicals were dissolved in the heavy oil and could be removed by water washing. The oil also contained water insoluble material. The separation, analysis, and identification of the oxygenated compounds in the water was accomplished primarily by precise fractionation, sometimes followed by preparation and examination of derivatives. To simplify the separation and recovery problem, the acids were first neutralized with caustic. Below are listed some of the compounds and azeotropes which were identified from the distillation curve by their boiling points and by analogy with previous distillations.

Acetaldehyde
Acetone—Methanol
Methanol
Ethanol—Ethyl acetate
Ethanol—Methyl ethyl ketone
Ethanol—Water
Propanol—Water
Butanol—Water The above compounds and azeotropes collectively accounted for about 16 percent of the high alkali catalyst water product of which about 7.5 percent or 47 percent of the overhead was ethyl alcohol-water. Less in quantity was the propanol-water alcohol amounting to about 2½ percent or 16 percent of the overhead.

An analysis and distribution of the oxygenated compounds produced with the 1.4 percent $K_2O$ catalyst are shown in Table VII below.

*Table VII*

| | Vol. percent |
|---|---|
| Aldehydes: | |
| Acetaldehyde | 1.6 |
| Propionaldehyde | 0.6 |
| Butyraldehyde and higher | 7.1 |
| Ketones: | |
| Acetone | 0.9 |
| Methyl ethyl ketone | 0.5 |
| Pentanone and higher | 2.0 |
| Esters: | |
| $C_3$ ester | 1.0 |
| $C_4$ ester | 1.2 |
| $C_5$ ester and higher | 6.6 |
| Alcohols: | |
| Methanol | 1.2 |
| Ethanol | 25.8 |
| Propanol | 5.2 |
| Butanol | 4.0 |
| Pentanol | 1.7 |
| Hexanol and higher | 7.1 |
| Acids: | |
| Acetic | 9.8 |
| Propionic | 4.6 |
| Butyric | 4.5 |
| Valeric | 2.6 |
| Caproic and higher | 12.0 |

The average distribution of total oxygenated compounds was about 60 percent in the product water and gas and about 40 percent in the oil. Ethanol was the most abundant of the non-acids produced and of the acids the lighter acids were most predominant, i. e., acetic, propionic, and butyric.

In the operation using the high alkali catalyst containing 1.4 percent $K_2O$ several catalyst samples were withdrawn from the reactor during operations to determine changes in analysis of the catalyst as the catalyst age increased. Oil and wax deposits were removed from the catalyst by xylene extraction. A sample of the extracted catalyst was next burned in a combustion tube in an atmosphere of oxygen and the resulting $CO_2$ measured to determine carbon. Another oil and wax free sample was used for chemical determination of iron. Data obtained from these analytical procedures and size analyses are shown in Table VIII.

*Table VIII*

POWDERED IRON CATALYST 1.4% $K_2O$ ANALYSES

| Run | Fresh | Recharge | 1 | 2 | 3 | 4 | 5 | 6 | Discharge |
|---|---|---|---|---|---|---|---|---|---|
| Catalyst Age, Hours | 0 | 372 | 545 | 611 | 721 | 761 | 804 | 882 | 931 |
| Operating Conditions: | | | | | | | | | |
| Temperature, °F | | 580 | 590 | 586 | 590 | 610 | 633 | 628 | 630 |
| Pressure, p. s. i. | | 8–250 | 250 | 250 | 400 | 250 | 250 | 250 | 250 |
| Inlet $H_2$:CO | | 2.5 | 2.3 | 2.1 | 2.5 | 2.3 | 1.9 | 2.1 | 2.8 |
| Analysis: | | | | | | | | | |
| Oil+Wax, Percent | 0 | 14.1 | 9.8 | 26.0 | 27.3 | 12.6 | 10.1 | 6.9 | 7.6 |
| Carbon | 0 | 17.1 | 18.9 | 15.8 | 16.3 | 22.0 | 23.4 | 23.6 | 24.0 |
| Iron | 93.4 | 50.9 | 40.7 | 43.3 | 45.0 | 55.2 | 53.8 | 58.0 | 60.0 |
| Iron Oxides | 1.0 | 9.1 | 21.5 | 7.7 | 5.2 | 2.7 | 7.8 | 2.8 | 1.0 |
| $Al_2O_3$ | 3.8 | | | | | | | | |
| $K_2O$ | 1.4 | 0.9 | | | | | | | |
| Total Fe | 94.1 | 57.9 | 57.4 | 49.3 | 49.1 | 57.2 | 57.9 | 60.1 | 60.7 |
| Lb. Cat./100 Lb. Fe | 106 | 173 | 174 | 203 | 204 | 175 | 167 | 161 | 165 |
| Lb. C/100 Lb. Fe | 0 | 29.5 | 32.9 | 32.1 | 33.1 | 38.5 | 39.1 | 39.3 | 39.5 |

From the data in Table VIII it is evident that a high alkali catalyst could be operated at relatively high temperatures (630° F.) without excessive coke formation. A period of very small change in carbon formation was attained after about 400 hours and maintained for an additional 350 hours. With the low alkali catalyst containing 0.6 percent $K_2O$, a similar steady state was reached after about 450 hours and maintained for about 200 hours. This steady state condition with the low alkali catalyst was about 23 lbs. c./100 lbs. of iron while with the high alkali catalyst it was about 33 lbs. c./100 lbs. of iron. An estimate of the relative volumes of original and approximately steady state catalyst indicated that the latter material would occupy nearly four times the original volume.

In Table IX is tabulated operating conditions and yields for the various catalysts having different alkali contents and 150 pounds per square inch pressure. Table IX is very similar to Table II but contrary to Table II the operating pressure was 150 pounds per square inch instead of 250 pounds per square inch. From this data presented in Table IX it is evident that the yield of oxygenated compounds with the high alkali catalyst is much larger than the low alkali catalyst even at low pressures of about 150 pounds. The discussion of Table II will apply in most respects to the analysis of the data in Table IX and consequently further discussion of Table IX is deemed unnecessary. It should be noted, however, that the data in Table IX substantiates the data in Table II and the discussion in connection therewith. The analysis of the oxygenated compounds, the gasoline fractions, and various other fractions as discussed in connection with the 250 pound pressure operations was found to be quite similar with the 150 pound operation as shown in Table IX below:

Table IX

| | | | |
|---|---|---|---|
| $K_2O$, percent by weight | 0.7 | 0.3 | 1.4 |
| Operating Conditions: | | | |
| Hours on condition | | 34 | 235 |
| Pressure, p. s. i. | 150 | 150 | 150 |
| Temperature, °F | 560 | 590 | 583 |
| Space Velocity— | | | |
| V./Hr./V | 415 | 1,525 | |
| C. F./Hr./Lb./Fe | 21.6 | 39.9 | 18.9 |
| Recycle Ratio Re/ff | No Recycle | 1.8 | 1.17 |
| $H_2$:CO Fresh Feed | 2.0 | 1.6 | 1.6 |
| $H_2$:CO Inlet | 2.0 | 2.15 | 2.4 |
| Contraction, percent | 52.8 | 52.8 | 53.0 |
| CO Conversion, Percent | 93.1 | 89.7 | 87.2 |
| Yields, Basis Fresh Feed cc.'s per Cubic Meter:[1] | | | |
| $C_3$ | 27 | | |
| $C_4$ | 14 | | |
| $C_3+C_4$ | 41 | 61 | 45 |
| $C_5+400°$ F | 20 | } 73 | 72 |
| 400–650° F | 43 | | |
| 650° F+ | | 1 | 4 |
| Total Hydro | 124 | 135 | 121 |
| Oxygenated Cpds | 8 | 5 | 32 |
| Total liquid (hydro.+oxy.) | 132 | 140 | 153 |
| Water | 79 | 85 | 75 |
| Selectivity, Percent: | | | |
| CO→$CO_2$ | 28.4 | 30.0 | 31.8 |
| CO→Oxygenated Cpds | 5.0 | 1.6 | 11.6 |
| CO→$C+C_2$ | 18.7 | 21.1 | 14.2 |
| CO→$C_3+C_4$ | 13.3 | 18.4 | 13.0 |
| CO→$C_5+$ | 34.6 | 28.9 | 29.4 |

[1] Cubic centimeters per cubic meter of total fresh feed.

Although the reduced ferruginous catalyst of this example has been considered to have an ultimate composition of metallic iron and $K_2O$, the actual composition of the catalyst may contain considerable amounts of unreduced oxides of iron. For convenience and clarity the $K_2O$ content is calculated on the basis that all the Fe in the catalyst is present as metallic iron. Also, although the potassium content of the catalyst is reported as $K_2O$, the potassium may be present in other forms than $K_2O$.

Various minor modifications of the apparatus and specific conditions of reaction may become apparent to those skilled in the art without departing from the scope of this invention.

Having described my invention, I claim:

1. A fused hydrogenation catalyst comprising iron containing between 0.1 and 1.5 weight percent potassium oxide based on metallic iron.

2. A fused hydrogenation catalyst comprising iron and between 0.1 and 1.5 weight percent of a promoter selected from at least one member of a group consisting of an alkali metal compound and an alkaline earth compound, the weight percent of the promoter being calculated as an oxide thereof based on iron.

3. A fused hydrogenation catalyst comprising elementary iron and between 0.1 and 0.7 weight percent of a promoter selected from at least one member of a group consisting of an alkali metal compound and an alkaline earth compound, the weight percent of the promoter being calculated as an oxide thereof based on iron.

4. A fused hydrogenation catalyst comprising elementary iron, and between 0.8 and 1.5 weight percent of a promoter selected from at least one member of a group consisting of an alkali metal compound and an alkaline earth compound, the weight percent of the promoter being calculated as an oxide thereof based on iron.

References Cited in the file of this patent

UNITED STATES PATENTS

| | | |
|---|---|---|
| 1,148,570 | Bosch et al. | Aug. 3, 1915 |
| 1,618,004 | Greathouse | Feb. 15, 1927 |
| 1,801,382 | Wietzel | Apr. 21, 1931 |
| 2,292,570 | Klemm et al. | Aug. 11, 1942 |
| 2,391,283 | Weber et al. | Dec. 18, 1945 |
| 2,398,462 | Roelen et al. | Apr. 16, 1946 |
| 2,438,584 | Stewart | Mar. 30, 1948 |
| 2,474,845 | Jenny et al. | July 5, 1949 |
| 2,488,150 | Walden et al. | Nov. 15, 1949 |
| 2,537,699 | Pierce | Jan. 9, 1951 |